No. 717,836. PATENTED JAN. 6, 1903.
C. R. GABRIEL.
FRICTION CLUTCH.
APPLICATION FILED JUNE 30, 1898.
NO MODEL.
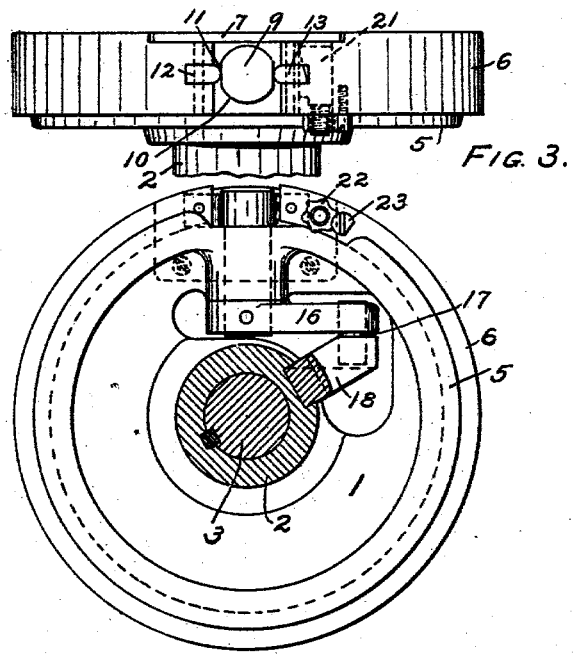
FIG. 3.
FIG. 2.
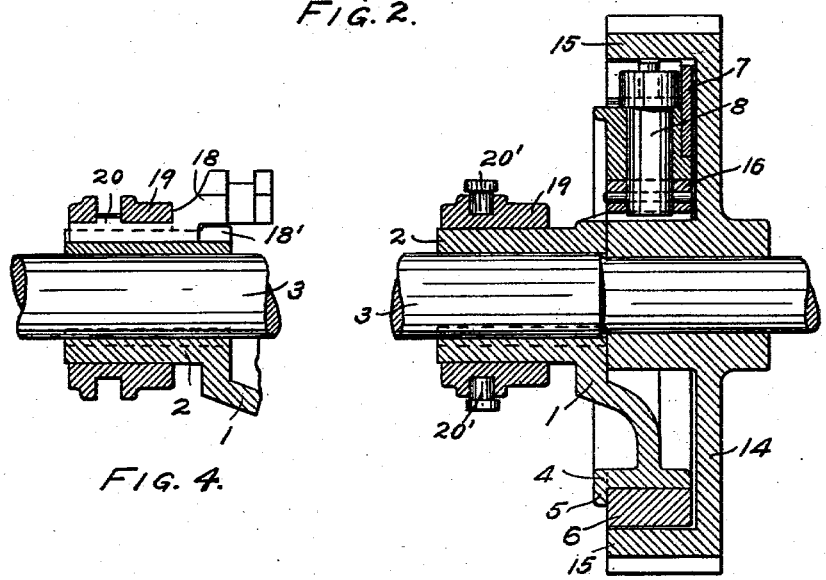
FIG. 4.
FIG. 1.
WITNESSES,
John Henshaw.
R. A. Bates.
INVENTOR,
Charles R. Gabriel,
BY Wilmarth H. Thurston
ATT'Y.
THE NORRIS PETERS CO., PHOTO-LITHO., WASHINGTON, D. C.

UNITED STATES PATENT OFFICE.

CHARLES R. GABRIEL, OF PROVIDENCE, RHODE ISLAND, ASSIGNOR TO THE BROWN & SHARPE MANUFACTURING COMPANY, OF PROVIDENCE, RHODE ISLAND, A CORPORATION OF RHODE ISLAND.

FRICTION-CLUTCH.

SPECIFICATION forming part of Letters Patent No. 717,836, dated January 6, 1903.

Application filed June 30, 1898. Serial No. 684,792. (No model.)

*To all whom it may concern:*

Be it known that I, CHARLES R. GABRIEL, of the city and county of Providence, in the State of Rhode Island, have invented certain new and useful Improvements in Friction-Clutches; and I do hereby declare the following specification, taken in connection with the accompanying drawings, forming a part of the same, to be a full, clear, and exact description thereof.

The object of the invention is to provide a friction-clutch which is simple in construction and positive in action and by which two rotary members may be securely and rigidly connected together without danger of throwing either out of true; and to these ends the invention consists in the features and combinations hereinafter set forth in the claims.

Referring to the drawings, Figure 1 is a sectional view of a clutch embodying the present invention. Fig. 2 is an end elevation of the clutch-body and spring-ring. Fig. 3 is a plan view of the same, and Fig. 4 is a detail of the operating-slide.

The clutch shown in the drawings and embodying the inventiom comprises a clutch-body on which is mounted a split spring-ring. The other member of the clutch is provided with a friction-surface which surrounds the split ring and with which said ring engages when expanded. The split ring is expanded to engage the friction-surface by a cam mounted on the clutch-body between the ends of the ring. When the cam is turned to force the ends of the ring apart, the ring in expanding conforms to the friction-surface, and therefore exerts an equal pressure upon said surface throughout the periphery of the ring, and there is no tendency to throw said surface out of true. Since the ring is disengaged from the periphery of the cam-body when it is expanded and the ends of said ring are free to move radially on the cam, there is no tendency to throw the clutch-body out of true.

A further feature of the above construction is that the member which is clutched to the clutch-body will run true, even should the clutch-body run out of true, since, as before stated, the split ring is freed from the periphery of the clutch-body and the ends of said ring may move radially on the cam. This feature is especially important in the case of gears where any wabbling of the gear will cause binding or pounding of the intermeshing gears.

When the split ring is expanded, said ring is firmly and rigidly united to the surrounding friction-surface, and the ring is positively and rigidly connected with the clutch-body by the cam between its ends, which forms a rigid abutment between the ends of the ring and relieves the devices for operating the cam from all strain.

Referring to the drawings in detail, the clutch-body 1 is provided with a hub 2, by which it is keyed to a shaft 3, and is also provided with a rim 4, having a flange 5 at its outer edge. A split spring-ring 6 is mounted on the rim of the clutch-body, said ring being made slightly smaller than the rim of the clutch-body, so that when said ring is sprung onto the clutch-body rim it will closely hug the periphery of said rim and will be supported and carried by said body. The ring is held in place transversely upon the clutch-body rim by the flange 5 and a plate 7, secured to the clutch-body and engaging the inner edge of said ring near its ends, the ends of said ring being recessed to receive said plate. A shaft 8 is journaled in the clutch-body, and a cam 9 is secured to or formed on the end of said shaft and lies between the ends of the split ring. The cam has two circular portions 10 and two flat portions 11, and two shoes 12 and 13 are mounted in the ends of the ring to bear against said cam. A rotary member in the form of a gear 14 is loosely mounted on the shaft 3 and is provided with a flange 15, which encircles the ring 6, the inner periphery of said flange forming a friction-surface with which the ring 6 is adapted to engage when it is expanded. When the ring is not expanded, however, it hugs the periphery of the clutch-body and is out of contact with the rotary member, so that there is no friction or wear between said ring and member. The cam may be operated to expand or contract the spring-ring by any suitable means and is preferably so operated by the means shown. As shown, an arm or lever 16 is secured to the inner end of the shaft 8 and has a pin 17 at its outer end which engages a slot formed in the end of a slide 18. The slide 18 is guided in a groove 18', formed in the hub 2, and is operated by a sleeve 19, mounted to slide on said hub and having a recess which is engaged by a lug 20 on said slide. The slide projects beyond the periphery of the hub 2 and enters a slot in the sleeve 19, thus serving as a key to cause the sleeve to revolve with the clutch-body. The sleeve may be operated by the common form of yoke, the ends of which are indicated at 20' in Fig. 1. When the cam is in the position indicated in the drawings, the spring-ring 6 does not engage the flange 15. When it is desired to connect the gear and shaft, the sleeve 19 is moved to rock the shaft 8 and cam 9, thus moving the circular surfaces 10 between the ends of the ring and forcing and holding said ends farther apart. The ring springs outward away from the periphery of the clutch-body and is forced firmly against the inner surface of the flange 15, said ring being free to conform to said surface and center itself within said flange. Since the ends of the ring bear upon the circular surfaces of the cam, said cam forms a rigid abutment between said ends, which supports the pressure of said ring, thus avoiding the danger of lessening the friction which would be present were the pressure of the ring supported by the parts for operating said cam. The ring now becomes, in effect, a part of the gear 14, and the gear and clutch-body are connected together by the engagement of the cam 9 with the ends of the ring 6. By this construction the parts are rigidly and firmly secured together, while any running out of true by one member will not affect the other, since the ends of the split ring may move radially on the cam.

In order to adjust the force with which the ring 6 is expanded within the flange 15, the shoe 13 may be made adjustable in the end of the ring. As shown, the end of this shoe rests against an inclined surface on a block 21, mounted to slide transversely in ring 6. The block 21 is provided with a screw-threaded shank, which projects from the side of the ring and is engaged by a nut 22. The nut is provided with circular recesses in its periphery arranged to be engaged by the head of a locking-screw 23 to hold the block in its adjusted position.

What I claim as my invention, and desire to secure by Letters Patent, is—

1. In a friction-clutch, the combination of a clutch-body, a split spring-ring mounted thereon, a rotary member provided with a friction-surface surrounding said ring, a radially-mounted shaft carried by said clutch-body, a cam on the end of said shaft between the ends of said ring, an arm 16 secured to the inner end of said shaft, a pin 17 on said arm, a slide 18 mounted longitudinally in said body and provided with a transverse slot engaged by said pin, and means for operating said slide, substantially as described.

2. In a friction-clutch, the combination of a clutch-body, a split spring-ring 6 mounted thereon, a rotary member provided with a friction-surface surrounding said ring, a radial shaft 8 mounted in said body, a cam 9 on the end of said shaft between the ends of ring 6, an arm 16 secured to said shaft, a pin 17 on said shaft, slide 18 longitudinally movable in said body and having a slot engaged by said pin, and sleeve 19 for operating said slide, substantially as described.

CHARLES R. GABRIEL.

Witnesses:
IRA L. FISH,
R. A. BATES.